United States Patent
Kobusch et al.

(10) Patent No.: US 6,776,566 B2
(45) Date of Patent: Aug. 17, 2004

(54) ASSEMBLY FOR AUTOMATICALLY COMPENSATING VARIATIONS IN THE SPACING BETWEEN TWO STRUCTURAL MEMBERS

(75) Inventors: Klaus Kobusch, Bielefeld (DE); Kai-Uwe Klaws, Oerlinghausen (DE); Klaus Friedrich, Bückeburg (DE)

(73) Assignee: Böllhoff GmbH, Bielefeld (DE)

( * ) Notice: Subject to any disclaimer, the term of this patent is extended or adjusted under 35 U.S.C. 154(b) by 0 days.

(21) Appl. No.: 10/268,194

(22) Filed: Oct. 10, 2002

(65) Prior Publication Data

US 2003/0077118 A1 Apr. 24, 2003

(30) Foreign Application Priority Data

Oct. 18, 2001 (DE) .......................................... 101 51 383

(51) Int. Cl.[7] .............................. F16B 43/00; F16B 37/08
(52) U.S. Cl. ........................ 411/546; 411/535; 411/432
(58) Field of Search ...................... 403/409.1; 411/546, 411/535, 432, 433, 183

(56) References Cited

U.S. PATENT DOCUMENTS

| | | | | |
|---|---|---|---|---|
| 2,842,180 A | * | 7/1958 | Brown | |
| 4,682,906 A | * | 7/1987 | Ruckert | |
| 5,288,191 A | * | 2/1994 | Ruckert | |
| 6,357,953 B1 | * | 3/2002 | Ballantyne | |
| 6,431,602 B1 | * | 8/2002 | Ralko | |

FOREIGN PATENT DOCUMENTS

| | | |
|---|---|---|
| DE | 91 12 424.7 | 1/1992 |
| DE | 42 28 625 | 3/1994 |
| DE | 35 33 299 | 11/1994 |
| DE | 43 14 431 | 11/1994 |
| DE | 42 24 575 | 7/2000 |
| DE | 199 49 654 | 4/2001 |

* cited by examiner

Primary Examiner—Flemming Saether
(74) Attorney, Agent, or Firm—Seyfarth Shaw LLP

(57) ABSTRACT

An assembly for automatically compensating variations of the spacing between first and second structural members due to manufacturing and/or mounting tolerances. The assembly comprises a bolt, a nut and a compensation sleeve. The compensation sleeve has left-handed external threads adapted to be threadingly engaged with mating left-handed internal threads of the nut, and a clamping portion adapted to be connected to the nut via frictional drag and rotatable relative to the bolt when said frictional drag has been overcome, such that the bolt when being rotated causes the compensation sleeve to rotate so as to be unthreaded from the nut. When the compensation sleeve has engaged the first structural member, the frictional drag will be overcome, and the bolt can be threadingly engaged with right-handed internal threads of the nut or the compensation sleeve for clamping the first and second structural members together. As a result thereof variations in the spacing between the first and second structural members will be automatically compensated.

11 Claims, 2 Drawing Sheets

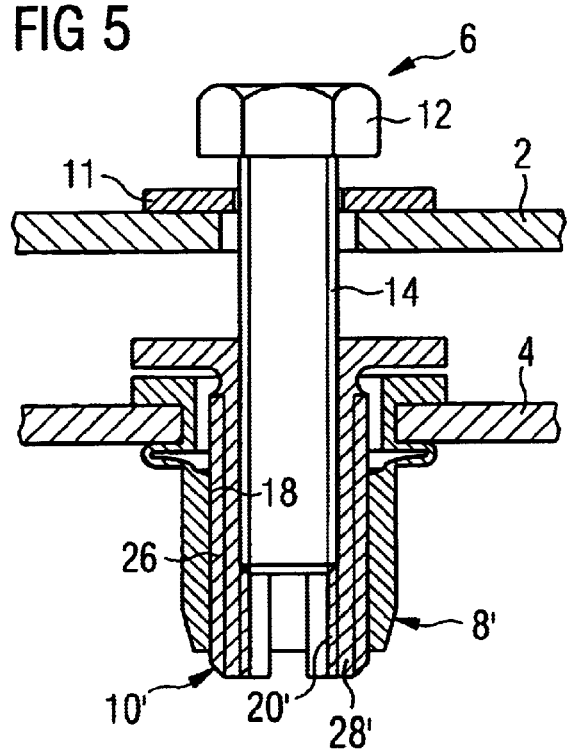
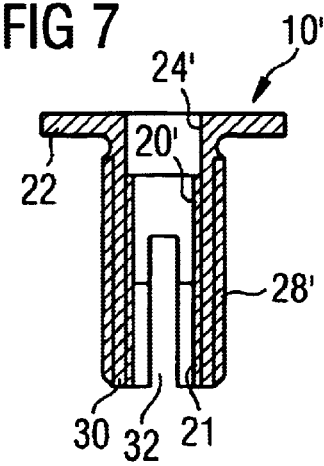
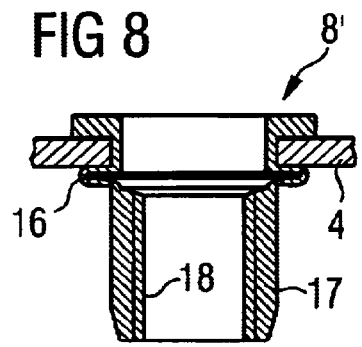
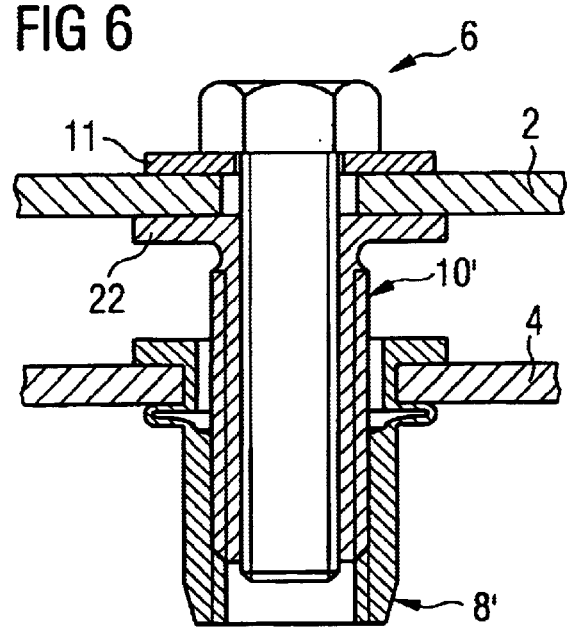
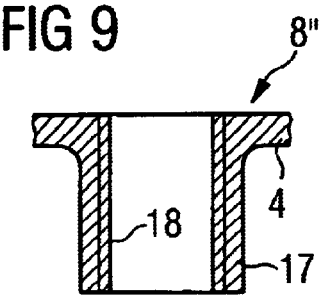
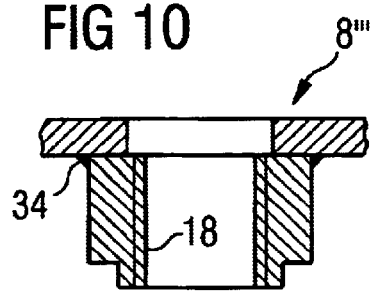

ASSEMBLY FOR AUTOMATICALLY COMPENSATING VARIATIONS IN THE SPACING BETWEEN TWO STRUCTURAL MEMBERS

BACKGROUND OF THE INVENTION

This invention relates to an assembly for automatically compensating variations in the spacing between first and second structural members due to manufacturing and/or mounting tolerances.

A vast number of assemblies for compensating variations in the spacing between structural members has become known. There has become known also assemblies which allow for automatic compensation of spacing variations, i.e. without any additional action of an operator, in order not to increase the time for assembly. Such assemblies are shown for example in the German patent application DE 100 04 697 A1 and in the European patent applications EP 0 176 663 A1 and EP 0 848 168 A1. All these assemblies are relatively complex in that they require a relatively large number of components resulting in relatively high manufacturing and mounting costs.

The German patent application DE 199 49 654 A1 discloses an assembly for compensating spacing variations, which comprises an compensating element which consists of internal and external threaded sleeves adapted to be threadingly engaged with each other. The external threaded sleeve is fixed to a first structural member via an annular member. The internal threaded sleeve is designed so as to provide for frictional drag between the sleeve and bolt such that the bolt when threaded into the internal threaded sleeve causes the latter to rotate therewith. As a result thereof the bolt is "unthreaded" from the external threaded sleeve until the internal threaded sleeve engages the second structural member. The bolt can then be inserted through the internal threaded sleeve and secured by a nut which is supported against the second structural member. This compensating assembly therefore requires, additional to the bolt and nut, a pair of threaded sleeves and a threaded annular member so that it suffers from the drawbacks as set forth above. Since furthermore the nut has to be operated to be threadingly engaged by the bolt after the compensating operation has been terminated, the compensating operation is only partially automatic.

The European patent application EP 0 533 513 A1 discloses an assembly for compensating spacing variations, which consists of a bolt, a nut comprising a blind rivet nut, a compensation sleeve, and a counter-nut. The compensation sleeve has internal and external threads so that on the one hand the compensation sleeve can be threaded into the nut and on the other hand the bolt can be threaded into the compensation sleeve. For the compensation of spacing variations the compensation is sleeve is rotated by a manual tool so as to be axially moved in the nut until it engages the first structural member. Thereafter the compensation sleeve is manually secured by the counter-nut in order to clamp the two structural members together.

The assembly does not allow for automatic compensation of spacing variations apart from the fact that it also requires a substantial number of components.

SUMMARY OF THE INVENTION

It is a general object of the invention to provide an improved assembly for compensating variations in the spacing between first and second structural members due to manufacturing and/or mounting tolerances, which avoids the disadvantages of the prior assemblies while affording additional structural and operational advantages.

An important feature of the invention is the provision of an assembly which allows for automatic compensation of spacing variations, i.e. without any additional manual operation by an operator.

A further feature of the invention is the provision of an assembly of the type as set forth which is of relatively simple and economical construction.

A further feature of the invention is the provision of an assembly of the type as set forth which requires a minimal number of components.

The assembly of the present invention requires only a bolt, a nut and a compensation sleeve, while a washer for the head of the bolt may be provided additionally. The bolt, the nut and the compensation sleeve are designed such that they include a right-handed pair of threads and a left-handed pair of threads. Furthermore, the compensation sleeve includes a clamping portion adapted to frictionally engage the bolt so as to be rotatable thereby. As a result of these measures, the bolt when being rotated for mounting the assembly to the structural members, initially causes the compensation sleeve to rotate so as to be "unthreaded" from the nut until the compensation sleeve engages the first structural member. Thereafter, the bolt can be rotated relative to the compensation sleeve so as to threadingly engage the nut directly or indirectly in order to clamp the two structural members together.

The pairs of right-handed and left-handed threads and the frictional drag between the compensation sleeve and the bolt provide for an assembly which requires only a minimal number of components, while the compensating operation is performed automatically, i.e. without any additional manual operation by an operator. As a result thereof the assembly of the present invention is of extremely simple and economical construction.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 5 is a cross-sectional view similar to FIG. 1 of a second embodiment of a compensating assembly;

FIG. 6 is a cross-sectional view similar to FIG. 6 of the compensating assembly in FIG. 5;

FIG. 7 is a longitudinal section of a compensation sleeve of the compensating assembly in FIGS. 5 and 6;

FIG. 8 is a longitudinal section of a nut of the compensating assembly in FIGS. 5 and 6;

FIG. 9 is a longitudinal section of a modified nut;

FIG. 10 is a longitudinal section of a further modified nut.

DETAILED DESCRIPTION OF PREFERRED EMBODIMENTS

Figure 1:
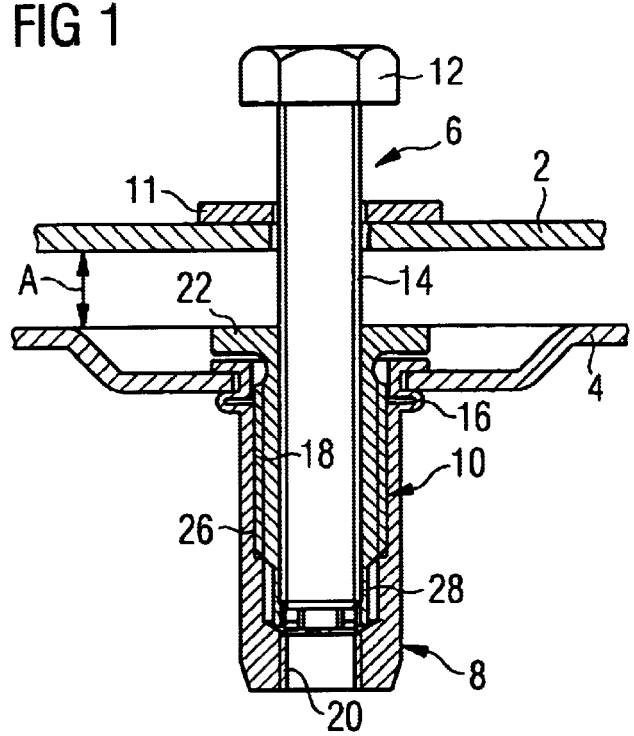
FIG. 1 is a cross-sectional view of a first embodiment of a compensating assembly at the outset of a compensating operation.
Figure 2:
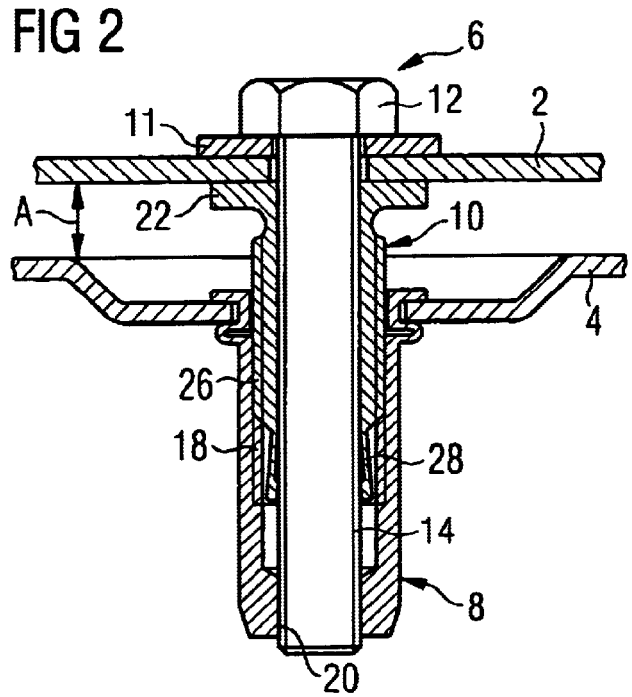
FIG. 2 is a cross-sectional view similar to FIG. 1 at the end of the compensating operation.

Referring to FIGS. 1 and 2, a first structural member 2 and a second structural member 4 are shown, which have been pre-assembled so as to be spaced form each other at a distance A. Furthermore, a compensating assembly is shown which serves to clamp structural members 2 and member 4 together and to provide for compensation of variations in the distance A between the structural members 2 and 4. The distance A between the structural members 2 and 4 is subject to variations due to manufacturing tolerances of the components and/or mounting tolerances as a result of various assembling operations, which variations are to be compensated by the compensating assembly to be described.

The compensating assembly consists of a bolt 6, a nut 8, and a compensation sleeve 10. Additionally, a washer 11 for the bolt 6 can be provided.

The nut 6 can be a conventional nut such as an "ISO" standard nut comprising a head 12 and a shaft provided with right-handed external threads 14.

Figure 4:
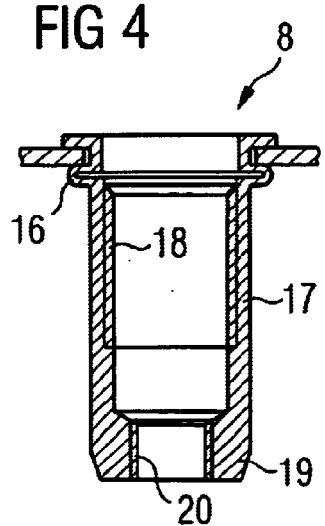
FIG. 4 is a longitudinal section of a nut of the compensating assembly of FIGS. 1 and 2.

The nut 8, as may be seen also in FIG. 4, comprises, in the present embodiment, a blind rivet nut having an upset area 16 which, as a result of an upsetting operation, forms a bead for fixedly connecting the nut 8 to the second structural member 4. Since such an upsetting operation is well-known to the skilled person, it will not be described any further here. The nut 8 has a first threaded portion 17 provided with left-handed internal threads 18 and, axially offset with respect thereto, a second threaded portion 19 provided with right-handed internal threads 20 which are matingly shaped with respect to the right-handed external threads 14 of the bolt 6.

Figure 3:
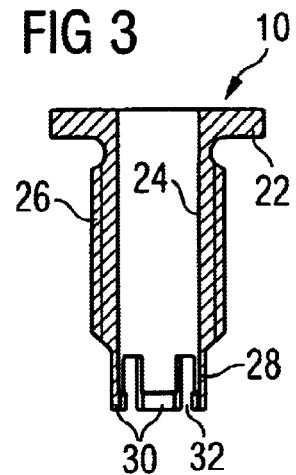
FIG. 3 is a longitudinal section of a compensation sleeve of the compensating assembly of FIGS. 1 and 2.

The compensation sleeve 10, as shown in particular in FIG. 3, comprises an annular member having a flange 22 provided at one end thereof, a smooth through-bore 24, right-handed external threads 26 which are matingly shaped with respect to the right-handed internal threads 20 of the nut 8, and a clamping portion 28. The clamping portion 28 comprises a resiliently expandable spring portion of an internal diameter which is smaller than the outer diameter of the bolt 6. More precisely, the clamping portion 28 comprises a plurality of circumferentially spaced resilient finger sections 30 which are defined by longitudinal slots 32 within the annular member of the compensation sleeve 10. The resilient finger sections 30 are provided with small, inwardly extending projections which provide for frictional drag between the bolt 6 and the compensation sleeve 10 when the bolt 6 is being inserted into the compensation sleeve 10. When the frictional drag has been overcome, the bolt 6 is rotatable relative to the compensation sleeve 10 as will be explained in more detail below.

Operation of the compensating assembly is as follows:

Initially the nut 8 is fixedly connected to the second structural member 4 by the upsetting portion 14. Thereafter, the compensation sleeve 10 is threaded into the nut 8. When the structural members 2 and 4 have been pre-assembled so as to be spaced from each other by the distance A, the bolt 6 is inserted in an insertion direction through aligned holes of the structural members 2 and 4 into the through-bore 24 of the compensation sleeve 10 far enough for the bolt 6 to reach the clamping portion 28 of the compensation sleeve 10. This is the operative condition shown in FIG. 1

When the bolt 6 will now be rotated by means of a wrench (not shown), it causes the compensation sleeve 10 to rotate therewith due to frictional drag between the clamping portion 28 and the external threads 14 of the bolt 6. Since the external threads 26 of the compensation sleeve 10 and the internal threads 18 of the nut 8 are left-handed threads (i.e. of a spiral direction opposite to the right-handed external threads of the bolt 6), the compensation sleeve 10 is rotated by the bolt 6 so as to move from the nut 8 in a direction opposite to the insertion direction until the flange 22 of the compensation sleeve 10 engages the underside of the first structural member 2. This operation actually provides for the compensation of variations in the distance A.

Since now the compensation sleeve 10 is fixedly supported against the first structural member 2, it cannot be rotated anymore by the bolt 6. Therefore, the bolt 6, when the frictional drag between the bolt and the compensation sleeve has been overcome, can now be threaded into the internal threads 20 of the nut 8. When the head 12 of the bolt 6 will be supported against the first structural member 2 via the washer 11, the bolt 6 will be tightened at a predetermined torque so as to clamp the structural members 2 and 4 together while they are spaced from each other by the distance A.

The embodiment of the compensating assembly shown in FIGS. 5 and 8 is of substantially similar structure as the preceding embodiment, with similar parts having been designated by the same reference numerals and modified parts by reference numerals added by '.

The embodiment of FIGS. 5 to 8 differs from the preceding embodiment substantially only in that the right-handed internal threads co-operating with the bolt 6 are not provided at the nut, but at the compensation sleeve.

Accordingly, in contrast to the nut 8 of FIG. 4, the nut 8' in FIG. 8 has only a single threaded portion 17 with left-handed internal threads 18, however not a second threaded portion 19. Therefore, it may be a commercially available standard blind rivet nut.

On the other hand, the through-bore 24' of the compensation sleeve 10, as shown in FIG. 7, is formed along the greater part of its axial length as a threaded bore having right-handed internal threads 20' adapted to be threadingly engaged with the bolt 6 for clamping the structural members 2 and 4 together. The clamping portion 28' is formed by the internal threads 20' in the area of the clamping portion 28' being of a smaller pitch diameter 21 than in the remaining area thereof. Furthermore the clamping portion 28' again has resilient finger sections 30 which are defined by longitudinal slots 32 in the annular member of the compensation sleeve 10'.

Operation of this embodiment is substantially the same as that of the preceding embodiment: When the nut 8' has been fixedly connected to the second structural member 4 by an upsetting operation, the compensation sleeve 10' has been threaded into the nut 8', and the structural members 2, 4 have been pre-assembled, the bolt 6 will be inserted through the structural member 2 into the compensation sleeve 10' until the smaller threaded portion 21 of the clamping portion 28' of the compensation sleeve 10' will be in frictional engagement with the bolt 6, as shown in FIG. 5. The compensation sleeve 10' will now be rotated by the bolt 6 so as to move from the nut 8' towards the structural member 2 until it will engage the same. The bolt 6 will now overcome the frictional drag by expansion of the clamping portion 28' so that the bolt 6 can be fully threaded into the compensation sleeve 10'. When the head 12 of the bolt 6 engages the washer 11, the bolt 6 is tightened at the predetermined torque in order to clamp the structural members 2 and 4 together.

It should be apparent that the embodiments described and illustrated above are capable of modification, variation and change without departing from the scope of the invention as defined in the appended claims. For example, while the pairs of threads 14, 20 and, respectively, 14, 20' have been described as being right-handed and the pairs of threads 18, 20 as being left-handed, it should be apparent that the spiral directions of these threads could be reversed.

Furthermore, the nut is not necessarily a blind rivet nut. Rather the nut can be fixed to the second structural member 4 in any appropriate manner. For example, the nut 8" can be formed so as to be integral with the second structural member 4 as shown in FIG. 9. Furthermore, the nut 8''' can be formed as a weld nut which is fixed to the second structural member 4 by a weld seam 34 as shown in FIG. 10. Other types of known nuts are also possible.

We claim:

1. An assembly for automatically compensating variations of a spacing between first and second structural members due to manufacturing and/or mounting tolerances, comprising:

a bolt having external threads of a first spiral direction, being adapted to extend through said first and second structural members, and comprising a head adapted to be supported against said first structural member, a nut having internal threads of an opposite second spiral direction and adapted to be fixed to said second structural member, and a compensation sleeve having a sleeve-shaped annular member with a through-bore and external threads of said second spiral direction mating to said internal threads of said nut, and a plurality of circumferentially spaced resilient finger sections being defined by longitudinal slots in an end of said sleeve-shaped annular member so as to form a clamping portion-adapted to provide for frictional drag between said compensation sleeve and said bolt, with said compensation sleeve being rotatable relative to said bolt when said is frictional drag has been overcome, such that said bolt when being inserted into said compensation sleeve in an insertion direction and being rotated causes said compensation sleeve to rotate due to said frictional drag therebetween so as to be threaded from said nut in a direction opposite to said insertion direction for compensation of variations in said spacing, and said bolt when said compensation sleeve will have engaged said first structural member is adapted to be rotated relative to said compensation sleeve so as to threadingly engage internal threads of said first spiral direction for clamping said first and second structural members together.

2. The assembly of claim 1, wherein said clamping portion comprises a resiliently expandable spring portion of an internal diameter smaller than an outer diameter of said bolt.

3. The assembly of claim 1, wherein said nut bas a first threaded section comprising said internal threads of said second spiral direction, and a second threaded section comprising said internal threads of said first spiral direction for clamping said first and second structural members together.

4. The assembly of claim 3, wherein said through-bore of said compensation sleeve has a smooth wall.

5. The assembly of claim 1, wherein said through-bore of said compensation sleeve is provided with said internal threads of said first spiral direction adapted to be threadingly engaged by the external threads of said bolt for clamping said first and second structural members together.

6. The assembly of claim 5, wherein said internal threads of said clamping portion of said compensation sleeve comprise a first area of a smaller pitch diameter and a second area of a greater pitch diameter.

7. The assembly of claim 1, wherein said compensation sleeve has an axial end provided with a flange engaging said first structural member when said assembly has been assembled.

8. The assembly of claim 1, wherein said nut comprises a blind rivet nut.

9. The assembly of claim 1 wherein said nut comprises a weld nut adapted to be welded to said second structural member.

10. The assembly of claim 1, wherein said nut is integral with said second structural member.

11. The assembly of claim 1, wherein said head of said bolt is adapted to be supported against said first structural member via a washer.

* * * * *

UNITED STATES PATENT AND TRADEMARK OFFICE
CERTIFICATE OF CORRECTION

PATENT NO.    : 6,776,566 B2
DATED         : August 17, 2004
INVENTOR(S)   : Kobusch et al.

It is certified that error appears in the above-identified patent and that said Letters Patent is hereby corrected as shown below:

<u>Title page</u>,
Item [75], Inventors, "Klaus Freidrich, Bückeburg (DE)" should be corrected as
-- Klaus Friedrich Grubert, Bückeburg (DE) --.

Signed and Sealed this

Fourteenth Day of December, 2004

JON W. DUDAS
*Director of the United States Patent and Trademark Office*